United States Patent
Fukuda et al.

[11] Patent Number: 5,811,907
[45] Date of Patent: Sep. 22, 1998

[54] SMALL GENERATOR

[75] Inventors: Masahiro Fukuda; Tohru Yoshioka; Youichi Haruta; Tohru Nishikura, all of Nitta-machi, Japan

[73] Assignee: Sawafuji Electric Co., Ltd., Tokyo, Japan

[21] Appl. No.: 735,712

[22] Filed: Oct. 23, 1996

[30]      Foreign Application Priority Data

Oct. 25, 1995 [JP] Japan .................................. 7-277443
Feb. 22, 1996 [JP] Japan .................................. 8-034527

[51] Int. Cl.⁶ ............................. H02K 1/16; H02K 17/28
[52] U.S. Cl. ......................... 310/254; 310/186; 310/216; 310/254; 310/261; 29/598
[58] Field of Search .................................. 310/186, 216, 310/254, 261, 269, 193

[56]            References Cited

U.S. PATENT DOCUMENTS

| Re. 28,705 | 2/1976 | Hoffmeyer | 310/180 |
| 2,731,574 | 1/1956 | Soredal | 310/49 |
| 3,062,978 | 11/1962 | Smith | 310/166 |
| 3,783,318 | 1/1974 | Widstrand | 310/216 |
| 5,338,996 | 8/1994 | Yamanoto | 310/217 |
| 5,349,741 | 9/1994 | Neuenschwander | 29/598 |
| 5,428,257 | 6/1995 | Lurkens | 310/168 |

FOREIGN PATENT DOCUMENTS

Sho-58-58893  12/1983  Japan .

Primary Examiner—Thomas M. Dougherty
Assistant Examiner—Tran N. Nguyen
Attorney, Agent, or Firm—McGlew and Tuttle

[57]            ABSTRACT

A small generator comprising a stator having slots on the inner circumferential surface thereof and generating windings wound on the slots, and a salient-pole type rotor freely rotating inside the stator, in which the stator has a plurality of recesses whose width is essentially the same as the width of openings of the slots and whose area is smaller than the area of the slots, provided at the same intervals as the circumferential intervals of the slots in the vicinity of the opening of the slots; the rotor has circular-arc shaped bulged portions formed outside a shaft hole on the rotor, and crimping portions whose width is smaller than the diameter of a shaft hole provided at the center of the bulged portions; the width of the magnetic path of the rotor winding portion is made more than twice as large as the minimum slot back length of the slots provided on the stator.

9 Claims, 14 Drawing Sheets

FIG. 6A
FIG. 6B
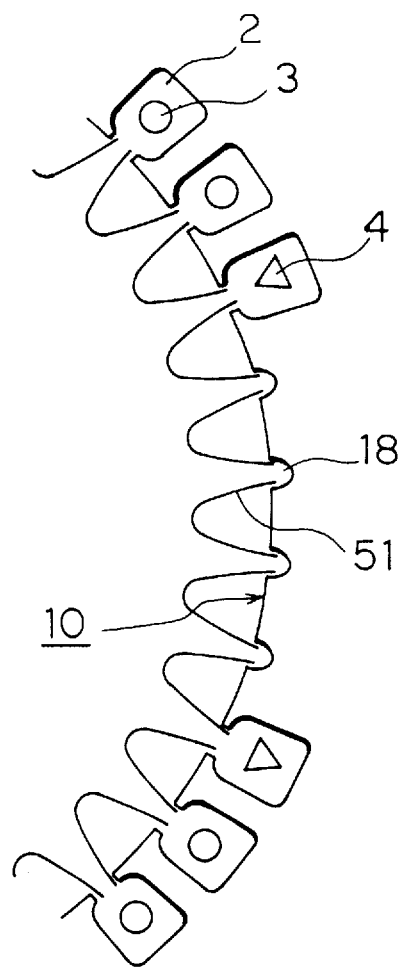
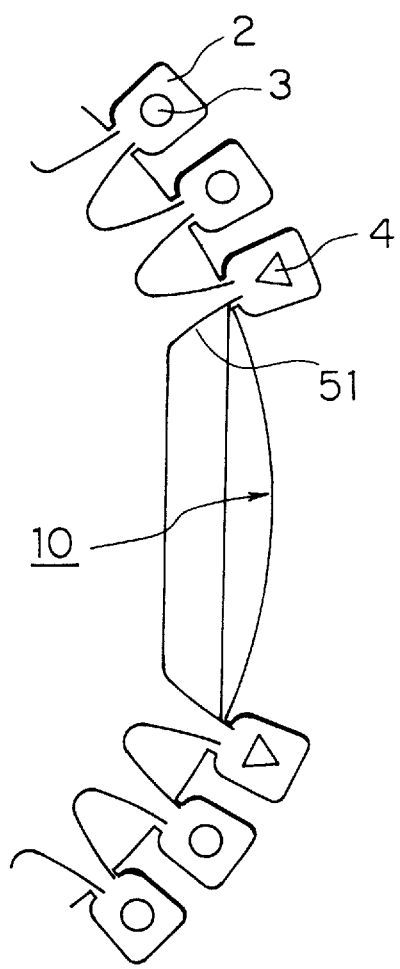

SMALL GENERATOR

FIELD OF THE INVENTION

This invention relates generally to a generator, more particularly to a small generator driven by an engine, and still more particularly to a construction of the stator and rotor that makes it possible to make generator size more compact and achieve increased output without sacrificing performances.

BACKGROUND OF THE INVENTION

FIG. 18 is a schematic diagram of assistance in explaining a conventional small generator. Reference numeral 10 refers to a stator, 20 to a rotor. The stator 10 is formed by laminating a plurality of ring-shaped stator cores 1. On the inner circumferential surface of the stator 10 provided at equal intervals are a plurality of slots 2 (36 slots, for example) on the inner circumferential surface of the stator 10. With a single-phase generator whose output voltage is automatically regulated, a main winding 3 is housed in 24 upper and lower slots 2, and an auxiliary winding 4 is housed in 4 left and right slots 2. The remaining 8 slots 2 are empty slots.

Inside the stator 10 rotatably provided around the shaft 21 is a 2-salient-pole rotor 20. The rotor 20 is formed by laminating a predetermined number of rotor cores 22 of a shape shown in FIG. 21. The rotor core 22 has a shaft hole 23 of a diameter b at the center thereof, and a rotor winding portion 24, on which the rotor winding is wound, having magnetic pole pieces 25 on both ends thereof. Bulged portions 26 of a diameter a are formed around the shaft hole 23 to facilitate the flow of magnetic fluxes. A field winding 28 is wound on the rotor winding portion 24 via a bobbin 27, as shown in FIG. 1.

The rotor core 22 shown in FIG. 22 is an improvement of the rotor core 22 shown in FIG. 21 in which workability in core laminating operation has been improved. The rotor core 22 shown in FIG. 22 has three crimping portions 29 formed on the rotor core 22 shown in FIG. 21 by lancing and raising the projections 30, as shown in an enlarged view of a crimping portion of FIG. 23, which is a fragmentary cross-sectional view taken in the direction of the arrows substantially along the line K—K of FIG. 22.

A stator core 1 constituting a stator 10 is formed into a shape having an outside diameter D by blanking a blank sheet having a size of A×B (A<D, B<D, A<B), with parallel portions 15 and 16 provided on the periphery on the sides of a main winding 3 and an auxiliary winding 4, respectively.

With a small generator having the aforementioned construction, as the rotor 20 rotates, a-c voltage is induced in the main and auxiliary windings 3 and 4 by remnant magnetism in the rotor 20. The a-c voltage induced in the auxiliary winding 4 is converted into a d-c voltage via a rectifier 41, causing a field current to flow in a field winding 28. By repeating this cycle, a voltage is generated, and an a-c voltage of a predetermined value is induced on output terminals 17 drawn from the main winding 3.

The main and auxiliary windings 3 and 4 are wound on the stator 10 with a winding inserting machine.

FIG. 19 is a perspective view of the essential part of a stator winding inserting machine.

In the figure, numeral 51 refers to a blade. The same number, 36, for example, of blades 51 as the number of slots 2 on the stator 10 are provided, arranged in a circular shape on a bottom plate (not shown) so that the edge of each blade 51 enters into the opening of the slot 2. Numeral 52 refers to a stripper having fins 53 provided in a gear-tooth fashion so that the fins 53 can enter in between the two adjoining blades 51. These gear-like fins 53 are vertically movably formed above the bottom plate via a shaft passing through the bottom plate.

To insert a winding into the slot 2 of the stator 10 with the aforementioned stator winding inserting machine, when the stator 10 is placed from above the blade 51 in a state where the auxiliary winding 4, for example, is held between the two blades 51, as shown in FIG. 19, part of the auxiliary winding 4 enters into the opening of the slot 2. Next, as the stripper 52 is lifted, a portion of the auxiliary winding 4 located around the center of the stator 10 is also pulled up into the slot 2 from between the blades 51, together with the stripper 52. As the portion of the auxiliary winding 4 is lifted by the stripper 52 and passes over the upper end of the blades 51, then all the auxiliary winding 4 is housed in the slot 2. After the auxiliary winding 4 has been housed in the slot 2, portions of the auxiliary winding 4 located on both end faces of the stator 10 are reshaped. This completes the winding inserting operation.

The aforementioned stator winding inserting machine is used for automatically inserting the main winding 3, which is formed into a shape of the figure eight, for example, in a similar procedure, as shown in FIG. 20, using a coil forming frame as disclosed in Japanese Published Examined Patent Publication No. Sho-58(1983)-58893, for example. Numeral 54 in FIG. 20 refers to a winding moving tool for moving the main winding 3 to the stator winding inserting machine while retaining the shape thereof.

In the stator 10 shown in FIG. 18, the width, that is, the slot back length W of the stator 10 near the slot 2 housing the auxiliary winding 4 is smallest. As a result, the cross-sectional area on a plane including the axis line of the stator 10 at this portion become smallest. This increases magnetic resistance, reducing the output of the main winding 3 due to magnetic saturation.

Forming the outer profile of the stator 10 into a perfect circular shape to increase the cross-sectional area of the stator 10 would increase the size of the material of the stator core 1, resulting in reduced blanking yield of the stator core 1 and increased manufacturing cost. Increasing the number of lamination of stator core 1 to increase the cross-sectional area would increase the size of the stator 10 in the axial direction. This is contrary to the miniaturization and light-weighting requirements for small generators and leads to increased manufacturing cost.

The rotor core 22 shown in FIG. 21 is formed by laminating a predetermined number of rotor cores 22 one by one and then press-fitting the lamination into the shaft 21. This leads to degraded workability.

The rotor core 22 shown in FIG. 22 is formed by assembling a predetermined number of rotor cores 22 into a core assembly using the three crimping portions 29 formed on the rotor core 22 as guides, and press-fitting the core assembly into the shaft 21. This lends itself to improved workability to be sure. In terms of performance, however, the presence of the projection 30 formed by lancing and raising the crimping portion 29 in a 20 magnetic path tends to hamper the flow of magnetic flux, leading to reduced output.

SUMMARY OF THE INVENTION

It is an object of this invention to provide a small generator whose output is increased without increasing the size of the rotor, that is, the outside dimensions of the generator.

It is another object of this invention to provide a stator that can make effective use of materials without sacrificing performance.

It is a further object of this invention to provide a stator into which generating windings can be automatically inserted without sacrificing performance.

It is still a further object of this invention to provide a rotor whose cores can be laminated efficiently without sacrificing performance by providing crimping means at locations where the flow of magnetic flux cannot be hampered.

It is still a further object of this invention to provide a rotor which can be manufactured by fully automating the lamination of rotor cores and winding of rotor coils.

The small generator disclosed in the embodiments comprises a stator having on the inner circumferential surface thereof slots on which generating windings are wound, and a rotor of a salient-pole type which is rotatable inside the stator, and has such a construction that the stator has a plurality of recesses having essentially the same width as the width of the slot openings and a smaller area than the area of the slots on the inner circumferential surface thereof in the vicinity of the slots on which generating windings are wound, and the rotor has crimping means of a smaller width than the diameter of the shaft hole at positions located at the center of circular-arc shaped bulged portions; and the width of the magnetic path of the rotor winding portion is made more than twice as large as the minimum slot back length of the slots provided on the stator so that the output of the generator can be increased without increasing the outside dimensions of the generator.

BRIEF DESCRIPTION OF DRAWINGS

FIG. 6a–b is a diagram illustrating the engagement of the stator having a recess with a blade for inserting the winding.

DETAILED DESCRIPTION OF PREFERRED EMBODIMENTS

Figure 1:
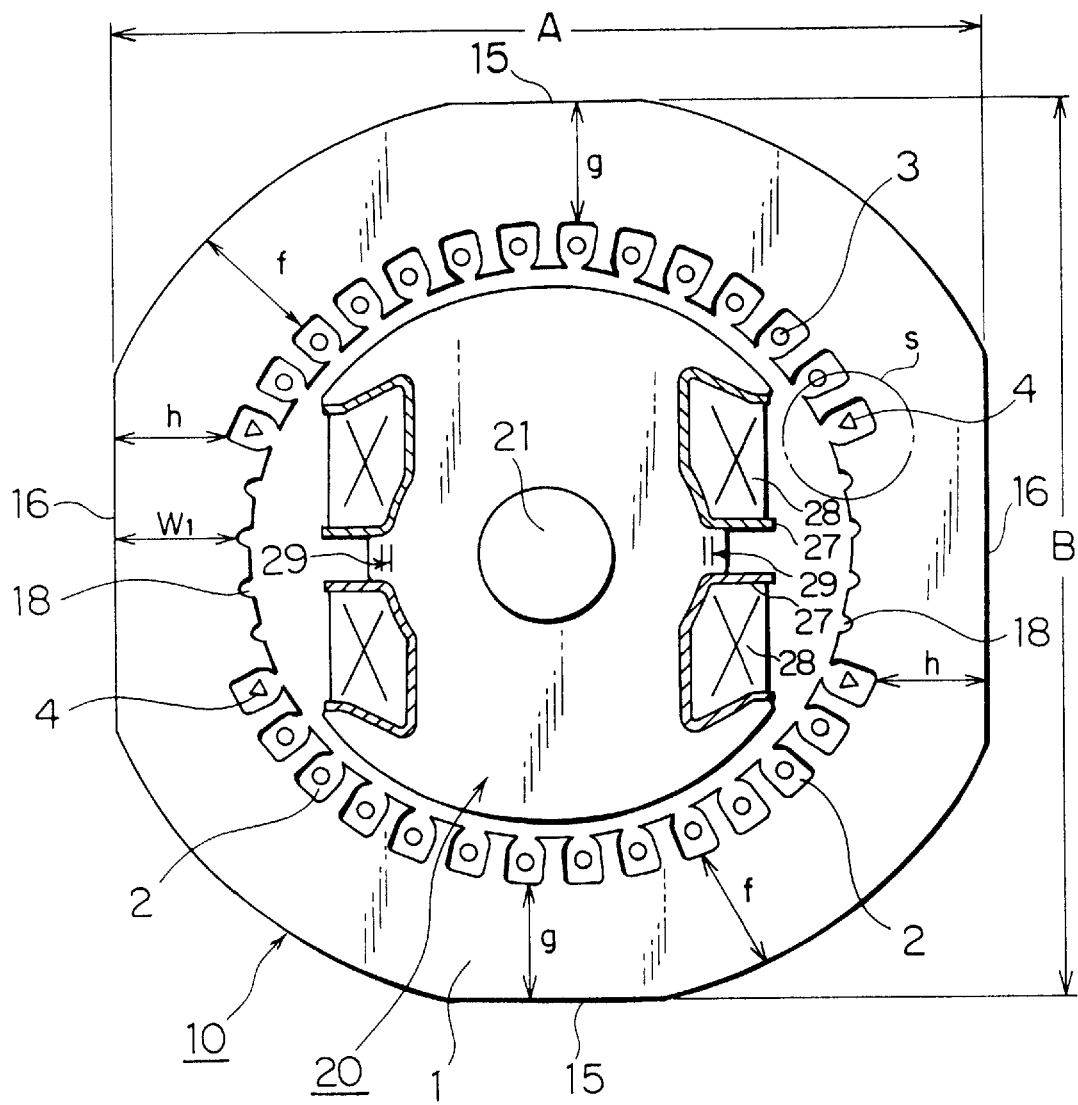
FIG. 1 is a diagram assistance in explaining the construction of a stator and rotor according to this invention.
Figure 2:
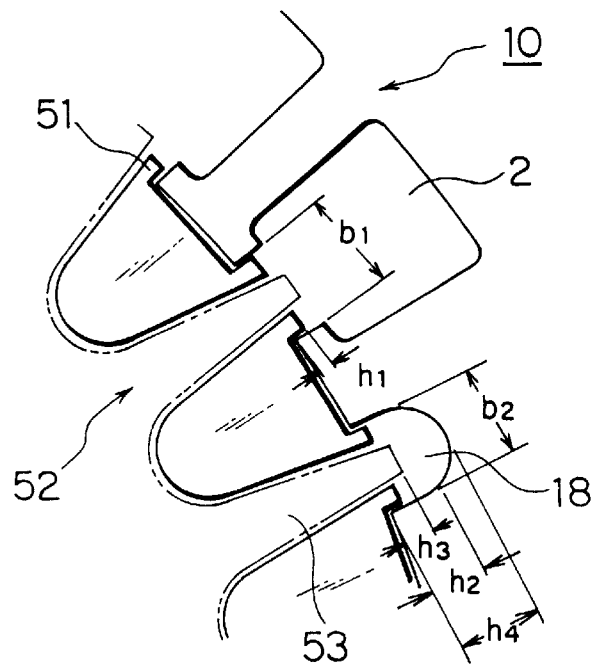
FIG. 2 is an enlarged view of the part S of FIG. 1.
Figure 3:
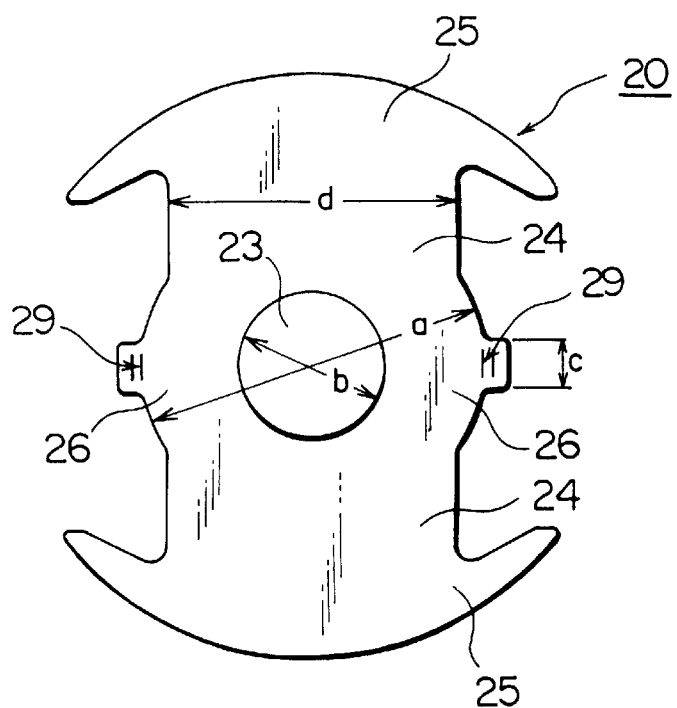
FIG. 3 is a plan view of an embodiment of a rotor core.

FIG. 1 is a diagram of assistance in explaining the construction of the stator and rotor of this invention, FIG. 2 is an enlarged view of the part S of FIG. 1, and FIG. 3 is a plan view of an embodiment of the rotor core.

Figure 18:
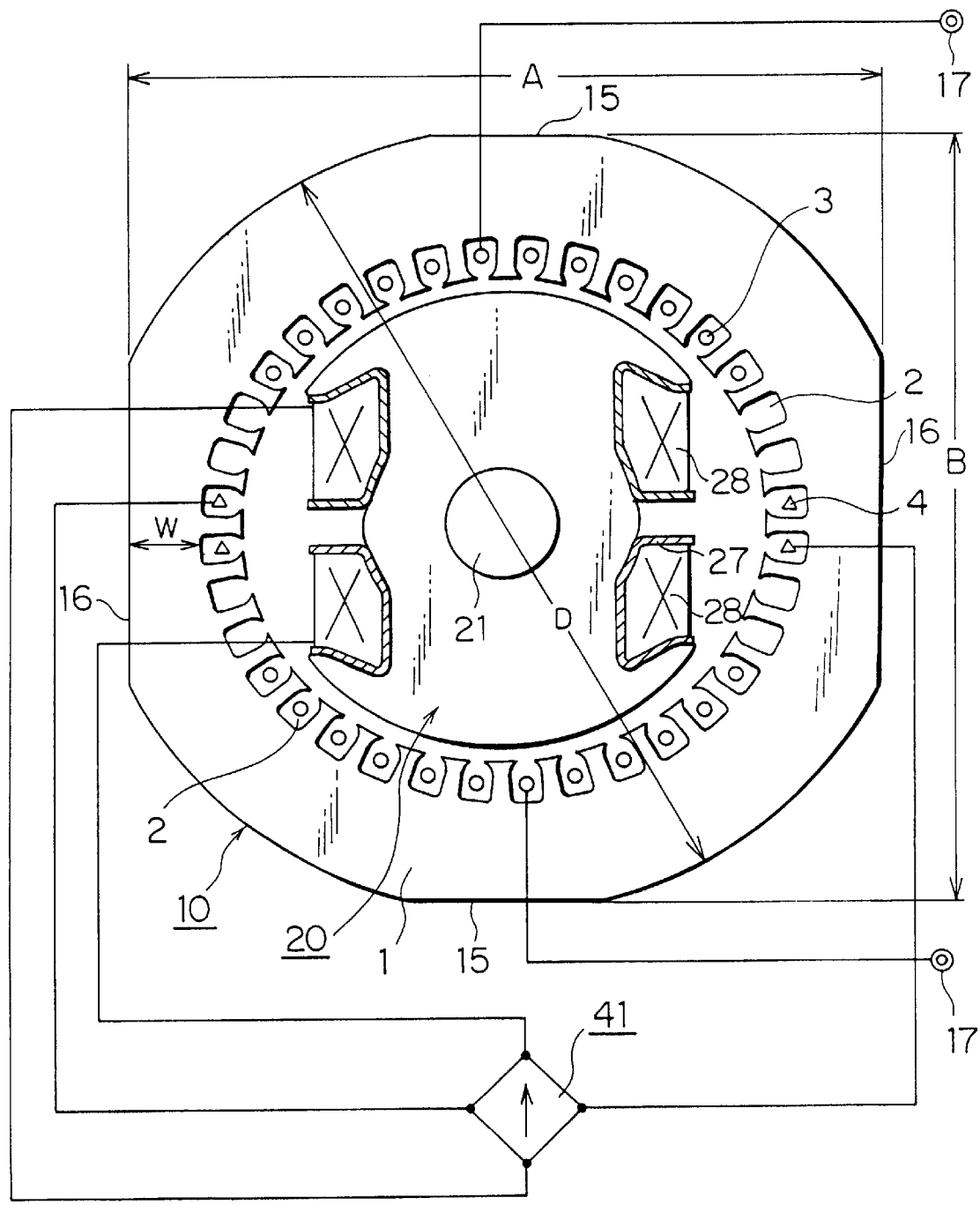
FIG. 18 is a diagram of assistance in explaining the outline of a conventional type of small generator.
Figure 21:
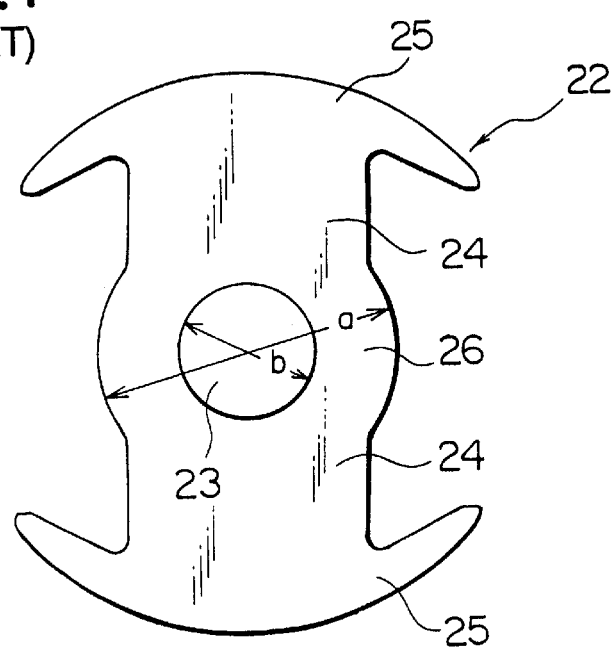
FIG. 21 is a diagram of assistance in explaining the shape of the rotor core of the conventional type of small generator.
Figure 22:
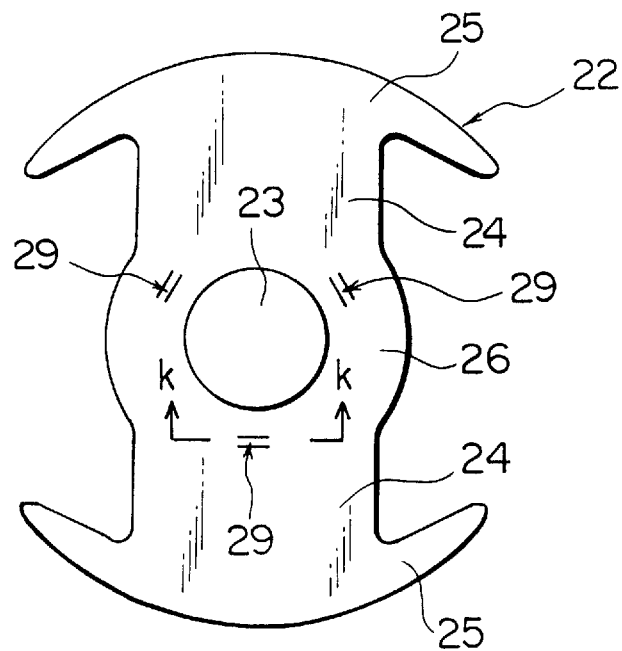
FIG. 22 is a diagram of assistance in explaining the shape of the rotor core of another embodiment of a small generator.

In FIGS. 1 through 3, like components are indicated by like numerals used in FIGS. 18 and 21 or 22. Numeral 18 denotes a recess which has essentially the same width $b_2$ as the width $b_1$ of the opening of the slot 2, and a depth $h_2$ larger than the lip height $h_1$, of the blade 51; a plurality of the recesses 18 being formed on the inner circumferential surface on the side corresponding to the parallel portion 16 of the stator 10 at the same circumferential intervals as the circumferential intervals of the slots 2, as shown in FIG. 2.

The depth $h_4$ of the recess 18 is made larger than the penetrated depth $h_3$ of the fin 53 of the stripper 52 into the opening of the slot 2. The area of the recess 18 is made smaller than the area of the slot 2.

The main windings 3 are housed in 24 slots 2 as in the case of the main windings shown in FIG. 18, while the auxiliary windings 4 are housed in 4 slots 2 adjacent to the main windings 3. Two sets of the auxiliary windings 4, each wound into a quadrangle and housed in two opposing slots 2, are connected in series so that the electrical angle thereof with the main windings 3 makes essentially an angle of 90°, for example.

Figure 23:
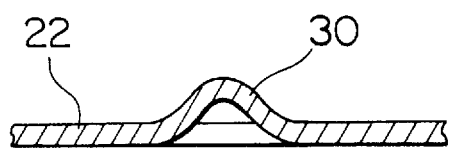
FIG. 23 is a fragmentary enlarged view of a crimping portion taken in the direction of the arrows substantially along the line K—K of FIG. 22.

The rotor 20 which rotates freely inside the stator 10 around the shaft 21 is formed by laminating rotor cores 22 having an outer shape shown in FIG. 3. The rotor core 22 has crimping portions 29 having a width c smaller than the diameter of the shaft hole 23 at locations at the center of the bulged portions 26 and outside the diameter a of the bulged portions 29. The crimping portions 29 have lanced and raised projections 30, as shown in FIG. 23. Since the crimping portions 29 are formed at locations outside the diameter a of the bulged portions 26, the crimping portions 29 do not impede the flow of magnetic flux, nor reduce the output of the generator.

A predetermined number of rotor cores 22 according to this invention are laminated sequentially into a core assembly comprising by crimping the rotor cores using the projections 30 of the two crimping portions 29 formed on the rotor cores 22. The shaft 21 is press-fitted to the laminated core assembly. Then, a bobbin 27 is fitted to the rotor winding portion 24, as shown in FIG. 1, and a field winding 28 is wound by a predetermined number of turns on the bobbin 27 with a winding machine. At this time, the same conditions for winding the field winding 28 as with the conventional method can be obtained since the width c of the crimping portions 29 is made smaller than the diameter b of the shaft hole 23. That is, a similar type of bobbin 27 to the conventional type can be fitted to the rotor winding portion 24. Furthermore, since the crimping portions 29 are provided at the center of the bulged portions 26, a path of cooling air is formed between the two bobbins 27, thus preventing the temperature of the field winding 28 from rising.

Moreover, a half of the width d of the rotor winding portion of the rotor core 22, that is, d/2, half of the rotor magnetic path width d, is made larger than the minimum slot back length X of the stator core 1 which will be described later, referring to FIG. 1. In this way, by making the half (d/2) of the rotor magnetic path width d of the rotor core 22 larger than the minimum slot back length X of the stator core 1, that is, by making the rotor magnetic path width of the rotor core 22 larger than 2X, twice the minimum slot back length X of the stator core 1, full use can be made of the effective magnetic flux generated by the rotor with respect to the stator core 1. The minimum slot back length used here means the slot back length at a location where the distance between the bottom of the slot and the outer periphery of the stator core is smallest, denoting g or h of the stator 30 core 1 in FIG. 1, e of the stator core 1 in FIG. 14, which will be described later, e of the stator core in FIG. 15, g or h of the stator core in FIG. 16, and f of the stator core in FIG. 17.

Figure 4:
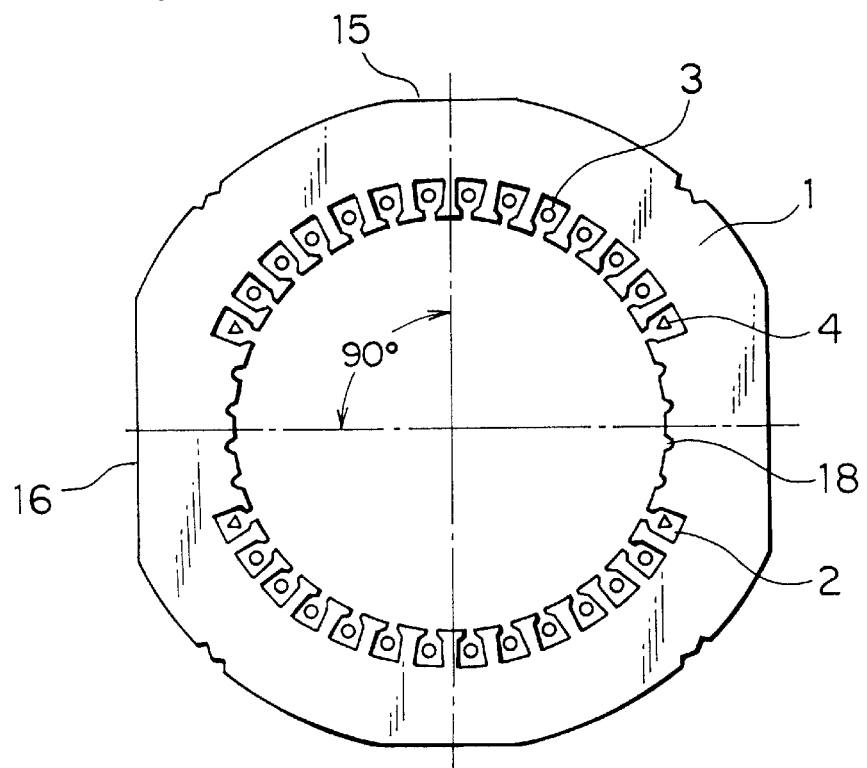
FIG. 4 is a winding layout diagram of assistance in explaining the electrical angle of the main and auxiliary windings in the stator shown in FIG. 1.
Figure 5:
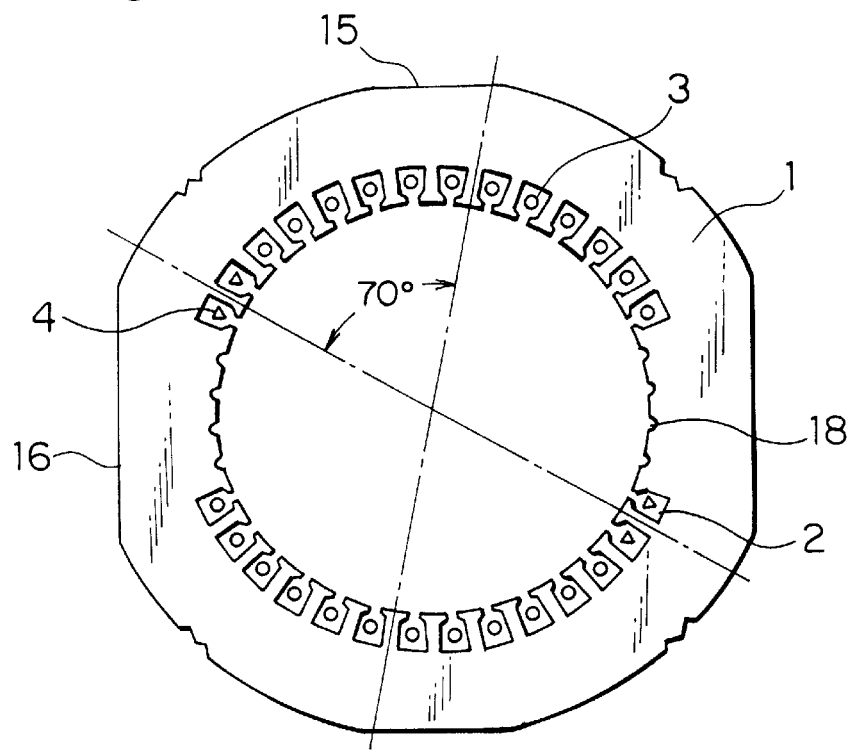
FIG. 5 is a winding layout diagram of assistance in explaining the electrical angle of the main and auxiliary windings in the stator shown in FIG. 1.

FIGS. 4 and 5 are winding layout diagrams of assistance in explaining the electrical angle of the main and auxiliary windings in the stator shown in FIG. 1. Like parts are indicated by like numerals used in FIG. 1.

FIG. 4 shows an auxiliary winding 4 wound in slots 2 adjacent to a main winding 3 disposed above and under the auxiliary winding 4; a plurality of recesses 18 provided between the slots 2 and 2 on which the auxiliary winding 4 is wound. In this case, the auxiliary winding 4 makes 90° of electrical angle with respect to the main winding 3. A rotor provided inside a stator is adapted so as to be rotatable in either clockwise or counterclockwise direction, and the rotor 20 shown in FIG. 1 or the conventional rotor 20 shown in FIG. 18 can be used for it.

FIG. 5 shows an auxiliary winding 4 wound in two slots adjacent to one side of the main winding 3; a plurality of recesses 18 provided between the slots 2 on which the auxiliary winding 4 is wound and the slots 2 on which the main winding 3 is wound. In this case, the auxiliary winding 4 makes 70° of electrical angle with respect to the main winding 3. A rotor provided inside a stator 10 is adapted to be rotatable only in the direction from the main winding 3 to the adjoining auxiliary winding 4, that is, in counterclockwise direction. The rotor provided inside the stator 10 is adapted to rotatable in either clockwise or counterclockwise direction, and the rotor 20 shown in FIG. 1 or the conventional rotor 20 shown in FIG. 18 can be used for it.

With the aforementioned construction having the stator 10 formed by laminating the stator cores 1, the operation of inserting the main and auxiliary windings 3 and 4 into the slots 2 of the stator 10 can be performed smoothly even with the same type of stator winding inserting machine as the conventional type.

Figure 19:
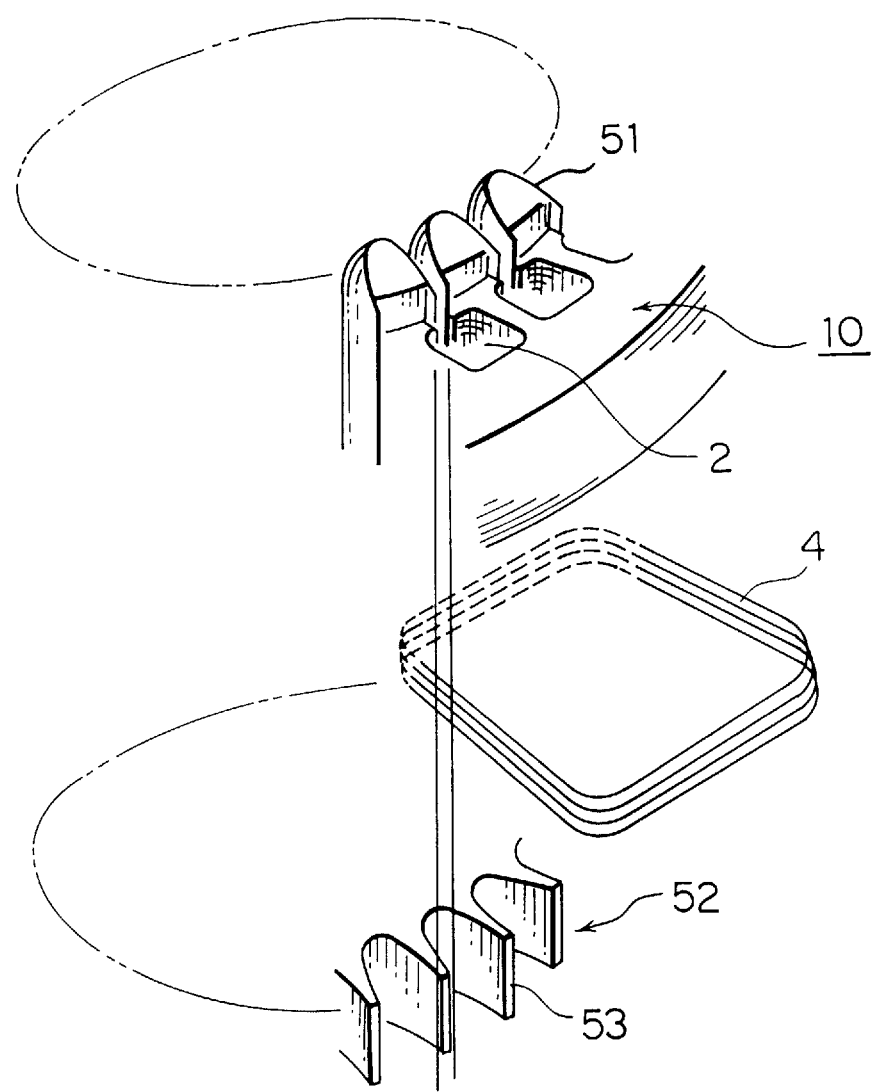
FIG. 19 is a perspective view of the essential part of a stator winding inserting machine.
Figure 20:
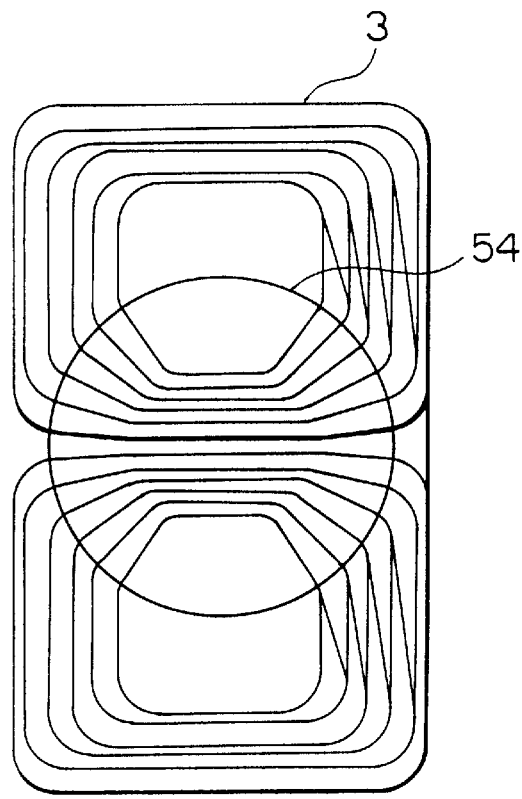
FIG. 20 is a plan view of assistance in explaining the main winding.

FIG. 6 is a diagram of assistance in explaining the engaging relationship between the stator having recesses and the blades for inserting windings. As shown in FIG. 6 (a), the blade 51 can be advanced smoothly toward the recess 18 because the slots 2 and the recesses 18 are provided on the inner circumferential surface of the stator 10 at the same circumferential intervals, and the recess 18 are formed in the aforementioned manner. The same holds true for the fin 53 of the stripper 52 shown in FIG. 19 which is advanced into the slot 2.

If the recesses 18 are not provided on the inner circumferential surface of the stator 10, the blade 51 and the stripper disposed in a special arrangement as shown in FIG. 6 (b) are required, making the winding inserting operation extremely complex and expensive. For this reason, the construction in which the aforementioned recesses 18 are provided on the inner circumferential surface of the stator 10 is more favorable than the construction in which the recesses 18 are not provided.

As shown in FIG. 1, the stator 10 of this invention has the slot back length $W_1$ of the recesses 18 larger than W in the conventional type shown in FIG. 18. This permits the crosssectional area in this portion of the stator 10 on a plane including the axial line to be made larger than that in the conventional type, making it possible to increase the amount of saturation magnetic flux. It was confirmed with experiments that as a result, output can be improved by more than 8%, for example.

Figure 7:
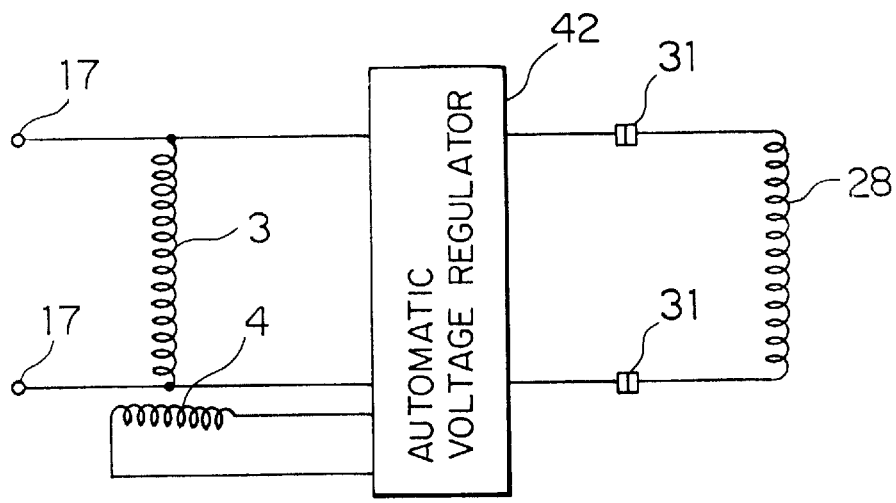
FIG. 7 is an electrical circuit diagram of a generator having an automatic voltage regulator in an embodiment of this invention.
Figure 8:
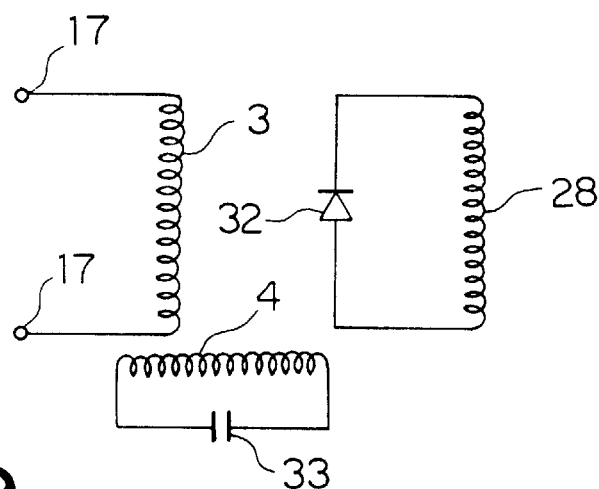
FIG. 8 is an electrical circuit diagram of a generator having an automatic voltage regulator in an embodiment of this invention.
Figure 9:
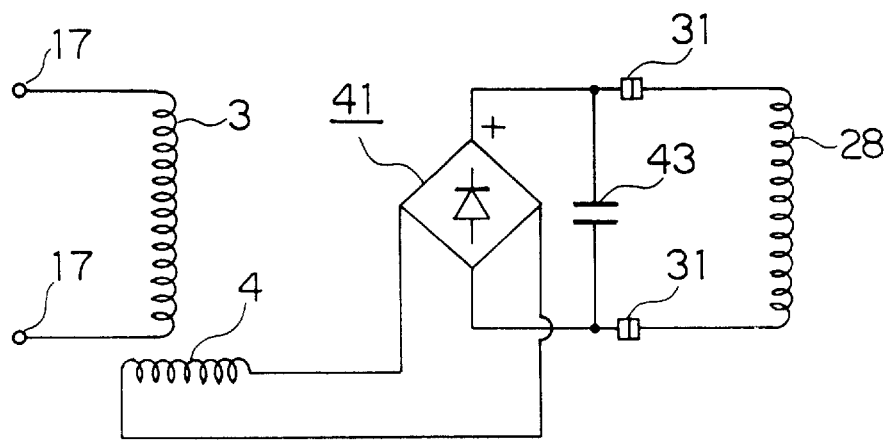
FIG. 9 is an electrical circuit diagram of a generator having an automatic voltage regulator in an embodiment of this invention.

FIGS. 7 through 9 are electrical circuit diagrams of a generator having an automatic voltage regulator in embodiments of this invention.

In FIG. 7, numeral 42 denotes an automatic voltage regulator for automatically controlling the output voltage of output terminals 17 at a constant level by detecting the output voltage of the main winding 3 and controlling the current to the field winding 28 of the rotor 20 based on the voltage generated by the auxiliary winding 4 provided on the stator 10. Numeral 31 denotes a slip ring.

FIG. 8 shows a brushless, self-excited type generator in which a diode 32 is connected to the field winding 8 on the side of the rotor 20, and a capacitor 33 is connected across the auxiliary winding 4 on the stator side. With this arrangement, a leading current flows in the auxiliary winding 4 and the voltage generated in the field winding 28 on the rotor 20 side is rectified by the diode 32, thereby causing the field current generating magnetic flux to flow in the field winding 28.

FIG. 9 shows the same type as that shown in FIG. 18.

In FIG. 9, a rectifier 41 has four diodes,. for example, connected in a bridge connection. A smoothing capacitor 43 should preferably be connected in parallel across the rectifier 41, but it may be omitted.

Figure 10:
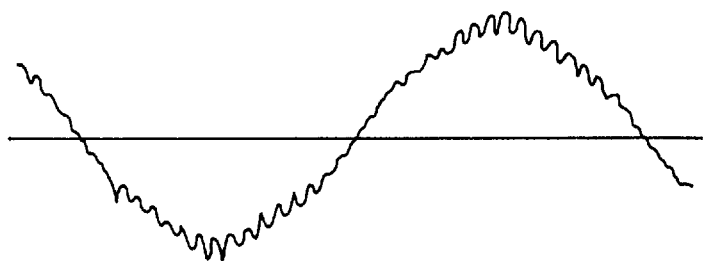
FIG. 10 is a waveform diagram of a no-load output voltage in a small generator embodying this invention.
Figure 11:
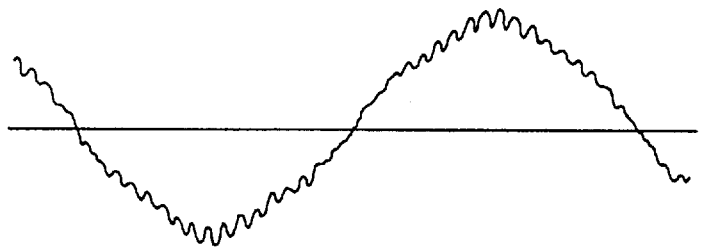
FIG. 11 is a waveform diagram of a no-load output voltage in a conventional type of small generator.
Figure 12:
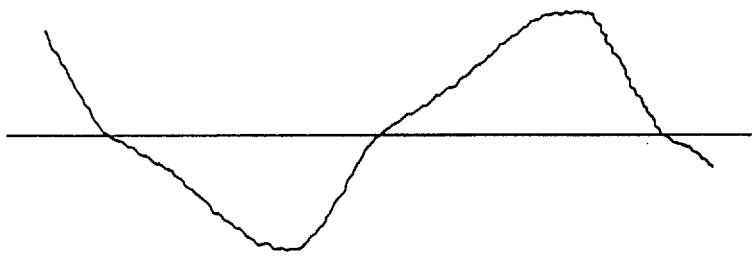
FIG. 12 is a waveform diagram of a loaded output voltage in a small generator embodying this invention.
Figure 13:
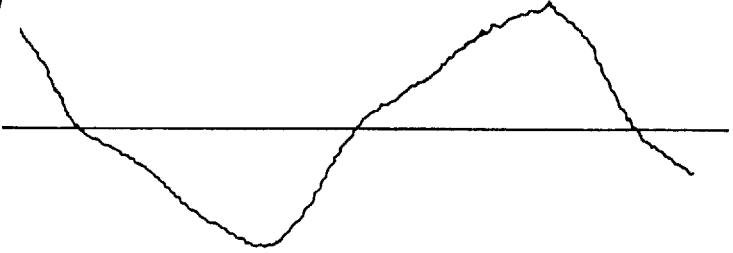
FIG. 13 is a waveform diagram of a loaded output voltage in a conventional type of small generator.

FIGS. 10 and 11 are waveform diagrams of no-load output voltage in the generator of this invention and that of the conventional type. FIGS. 12 and 13 are waveform diagrams of loaded output voltage in the generator of this invention and that of the conventional type.

It was confirmed from these diagrams that the generator of this invention can produce an output voltage waveform equivalent to that generated by the conventional type. This is attributable to the fact that the existence of a plurality of recesses 18 even at locations where there are no windings on the inner circumferential surface of the stator 10, as shown in FIG. 1, in this invention permits torque ripples to be small even when the output voltage is in the vicinity of zero.

In this embodiment, description has been made about an example where 28 slots 2 and 8 recesses 18 are provided on the stator 10. However, the number of slots and recesses may be selected, depending on the functions required of the generator. The recesses 18 may be of any type other than the semi-circular shape.

FIGS. 14 through 17 are diagrams of assistance in explaining the shape of the stator core used in conjunction with the rotor of FIG. 1.

Figure 14:
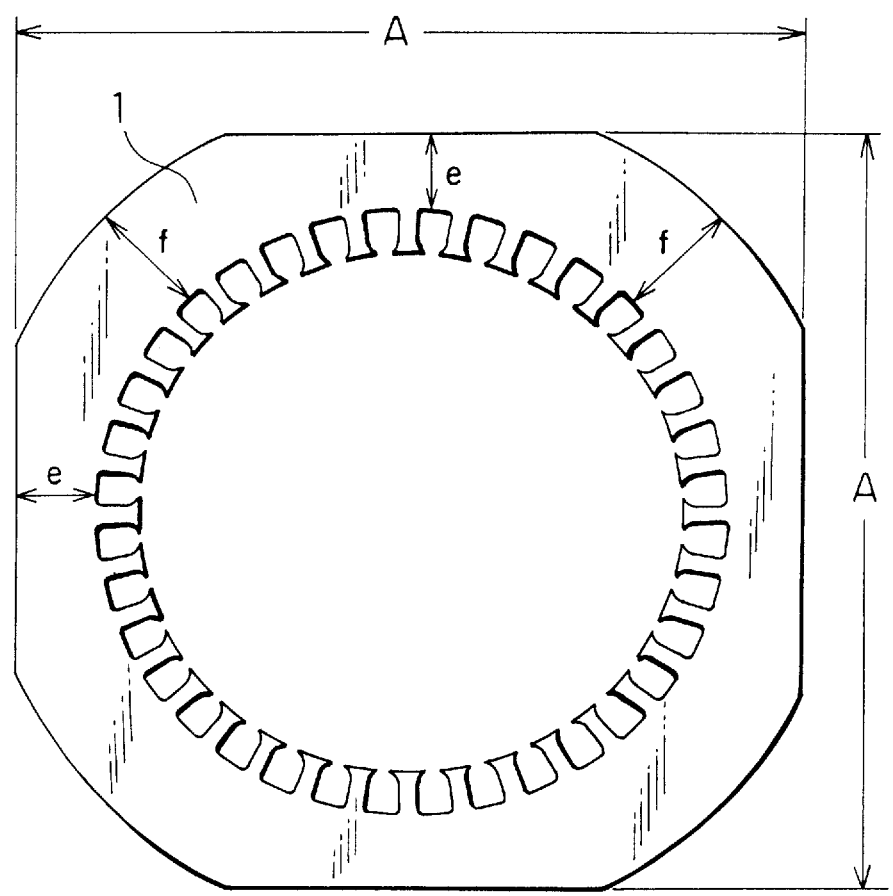
FIG. 14 is a diagram of assistance in explaining the shape of an embodiment of stator core used in conjunction with the rotor shown in FIG. 1.

The stator core 1 shown in FIG. 14 is of a shape obtained by cutting uniformly the four sides of a circular-shaped rotor core so that the longitudinal sectional shape becomes a square with both the height and width being A. At portions where the outer periphery of the. stator 10 was cut off, the minimum slot back length of e is produced, and the slot back length at other portions where the outer periphery of the stator 10 is not cut off is f (f>e).

When the stator core 1 shown in FIG. 14 is used, the width d of the rotor winding portion 24 of the rotor core 22, that is, the rotor magnetic path width d has a relationship of d/2>e, that is, a relationship where the rotor magnetic path width d of the rotor core 22 is larger than twice the minimum slot back length e (d>2e).

Figure 15:
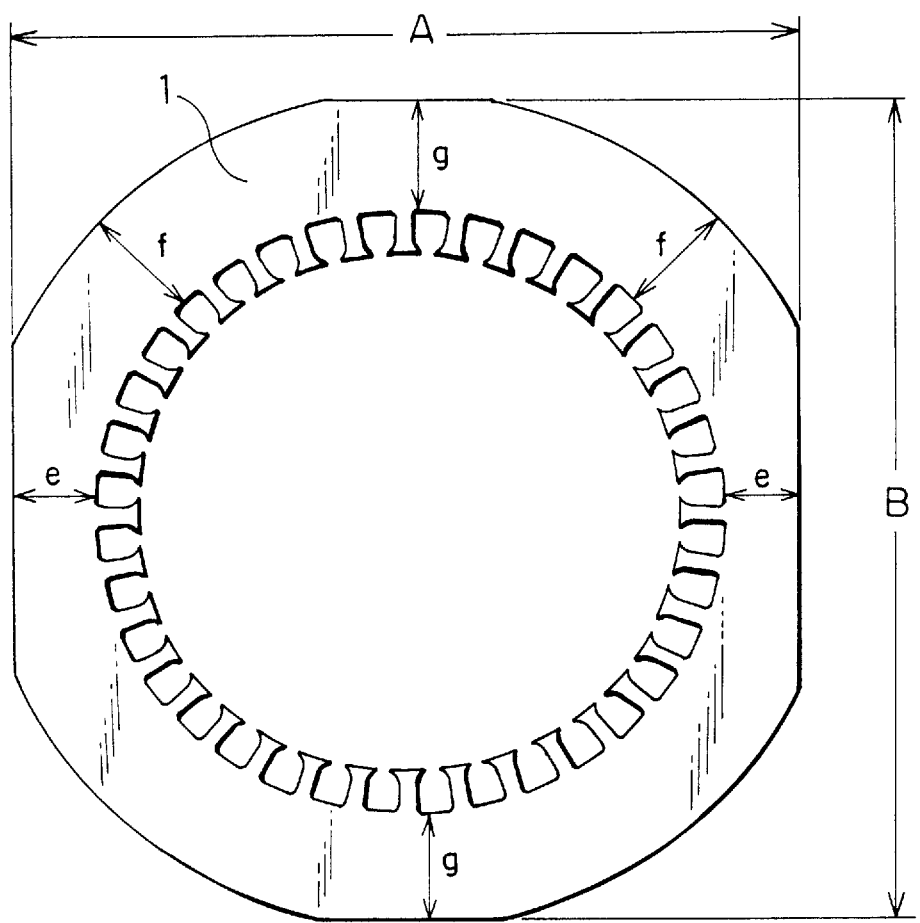
FIG. 15 is a diagram of assistance in explaining the shape of another embodiment of stator core used in conjunction with the stator shown in FIG. 1.

The stator core 1 shown in FIG. 15 is of a shape obtained by cutting uniformly the two opposing sides each of a circular-shaped rotor core so that the longitudinal sectional shape becomes a rectangle with the height thereof being B and the width thereof being A (A<B). With this rotor core 1, the minimum slot back length e is produced in the lateral direction of the portion where the outer periphery of the stator core 1 is cut off, the slot back length in the longitudinal direction of the portions where the outer periphery of the stator core 1 is cut off becomes g, and the slot back length f at the portions where the outer periphery of the stator core 1 is not cut off becomes f (f>g>e).

Figure 16:
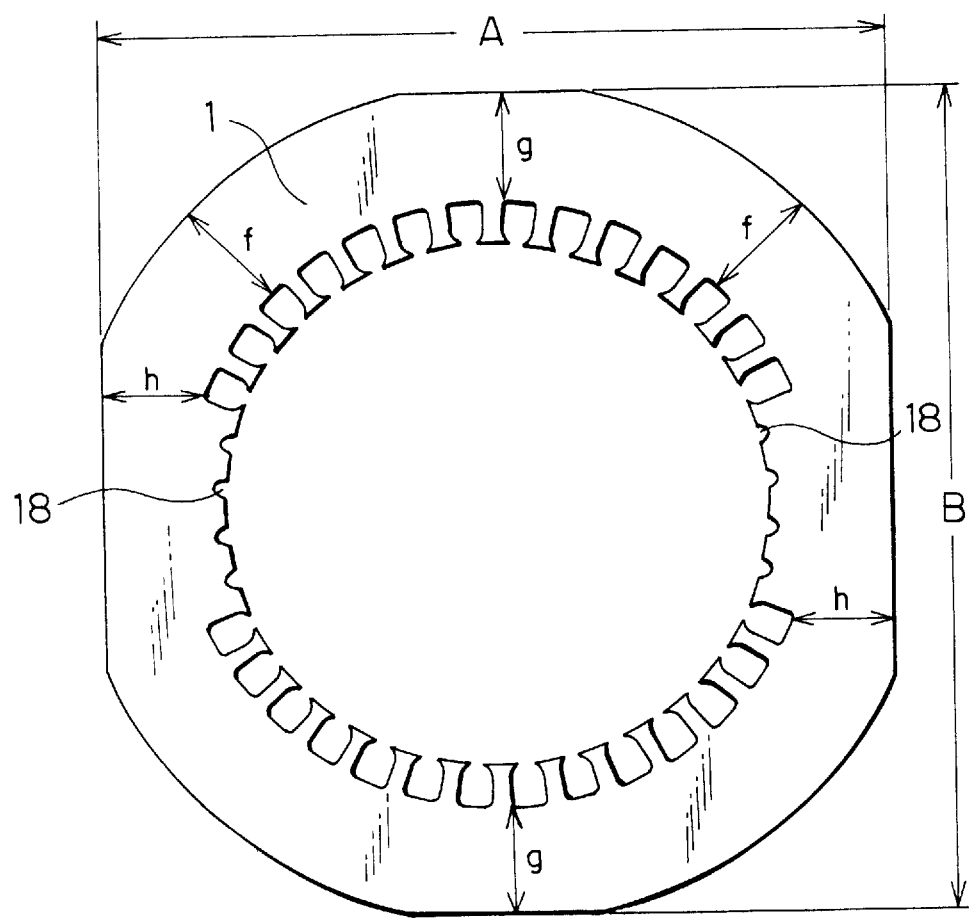
FIG. 16 is a diagram of assistance in explaining the shape of still another embodiment of stator core used in conjunction with the stator shown in FIG. 1.

The stator core 1 shown in FIG. 16 is of a shape where recesses 18 for automatically inserting stator windings with a stator winding inserting machine are provided on part of the stator core 1 in place of slots. The stator core 1 shown in FIG. 16, which is the same as shown in FIG. 1, is of a shape obtained by cutting uniformly the two opposing sides each of a circular-shaped stator core so that the longitudinal sectional shape thereof becomes a rectangle, similarly to that shown in FIG. 15, with the height thereof being B and the width thereof being A (A <B). The slot back length at the portions where the outer periphery of the stator core 1 is not cut off is f, while the minimum slot back length produced in the lateral direction of the portion where the outer periphery of the stator core 1 is cut off and slots are not provided is h. In cases, however, where the minimum slot back length may be produced in the lateral direction of the portions where the outer periphery of the stator core 1 is cut off and slots are provided, as shown in FIG. 15, the minimum slot back length in this case is e (h>e), while the slot back length in the longitudinal direction of the portions where the outer periphery of the stator core 1 is g (f>g>h).

When the stator core 1 shown in FIG. 16 is used, the width d of the rotor winding portion 24 of the rotor core 22, that is, the rotor magnetic path width d has a relationship of d/2>h, or d/2>e, that is, a relationship where the rotor magnetic path width d of the rotor core 22 is larger than twice the minimum slot back length h or e (d>2h or d>2).

Figure 17:
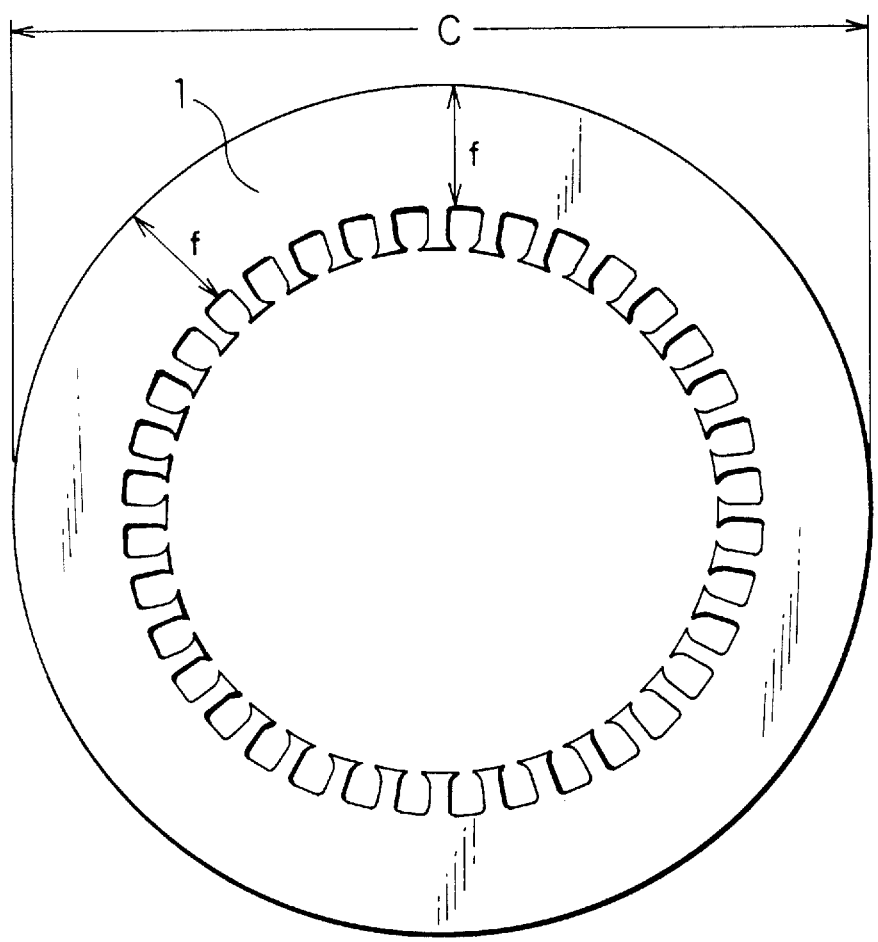
FIG. 17 is a diagram of assistance in explaining the shape of a further embodiment of stator core used in conjunction with the stator shown in FIG. 1.

The stator core shown in FIG. 17 is of a circular shape in cross section (diameter: C). In this case, the slot back length 10 of the stator core 1 is invariably f, and the minimum slot back length is no doubt f.

When the stator core 1 shown in FIG. 17 is used, the width d of the rotor winding portion 24 of the rotor core 22, that is, the rotor magnetic path width d has a relationship of d/2>f, that is, a relationship where the rotor magnetic path width d of the rotor core 22 is larger than twice the minimum slot back length f (d>2f).

As is obvious from the above description, (1) magnetic flux saturation can be reduced and output can be increased more than the conventional type since the slot back length near the position where the stator auxiliary winding is housed can be made larger.

(2) manufacturing cost can be reduced, in connection with (1) above, because the number of lamination of stator cores can be reduced for a generator of the same output.

(3) the same winding inserting means as used with the conventional type can be used because recesses are provided at the same circumferential intervals.

(4) an output voltage waveform equivalent to that with the conventional type can be obtained because a plurality of recesses are provided in the stator.

(5) output can be increased since half (d/2) of the rotor magnetic path width d of the rotor core is made larger that the minimum slot back length X of the stator core, allowing the effective magnetic flux of the rotor to be used fully with respect to the stator core.

(6) the copper loss of the rotor can be reduced, in connection with (5) above, since the cross-sectional area of the entire rotor winding can be reduced compared with the cross-sectional area of the entire rotor winding with the conventional type to obtain the same output, the leak of the rotor magnetic flux can be reduced.

(7) workability in laminating cores can be improved without sacrificing output characteristics because crimping means of a width smaller than the diameter of the shaft hole are provided at locations in the middle of the circular-arc shaped bulged portions in such a manner as to protrude from the bulged portions.

(8) the same winding conditions as with the conventional type can be maintained because the same bobbin as with the conventional type can be fitted to the assembled rotor core.

(9) Assembly of the rotor can be automated because rotor cores can be laminated and crimped with the lanced and raised portions of the two crimping means.

What is claimed is:

1. A generator comprising:
   a stator having an inner circumferential surface, said inner circumferential surface defining a plurality of slots and a plurality of recesses, each of said recess having an area smaller than an area of said slot, said each recess also having a width substantially equal to a width of said slot, said plurality of slots and said plurality of recesses being positioned at a same circumferential interval around said inner circumferential surface, said stator having a minimum slot back length defined at a location where a distance between a bottom of said slot and an outer periphery of said stator is smallest;
   generating windings arranged in said plurality of slots;
   a salient-pole type rotor arranged in said stator, said rotor defining a shaft hole and forming a circular-arc shaped bulged portion around said shaft hole, said rotor having a winding portion forming a magnetic path, a width of said magnetic path being larger than twice said minimum slot back length, said rotor including crimping portions positioned at a center of said bulged portion having a width smaller than a diameter of said shaft hole.

2. A small generator as set forth in claim 1 wherein parallel portions of said stator have opposing sides smaller than the outside diameter of said stator are provided on an outer periphery of said stator on a side adjacent to said recesses.

3. A small generator as set forth in claim 1 wherein said generating windings wound on said stator have main and auxiliary windings; said auxiliary windings being wound adjacent to said main windings.

4. A small generator as set forth in claim 2, wherein said generating windings wound on said stator have main and auxiliary windings; said auxiliary windings being auxiliary windings being wound adjacent to said main windings.

5. A generator comprising:

a stator having an inner circumferential surface, said inner circumferential surface defining a plurality of slots and a plurality of recesses, each of said recess having an area smaller than an area of said slot, said each recess also having a width substantially equal to a width of said slot, said plurality of slots and said plurality of recesses being positioned at a same circumferential interval around said inner circumferential surface;

a generating winding arranged in said plurality of slots;

a salient-pole type rotor rotatably arranged in said stator, said rotor being formed of a plurality of laminated rotor cores, each said rotor core having a winding portion forming a magnetic path, said each rotor core including two pole portions arranged on ends of said winding portion, said each rotor core rotor defining a shaft hole arranged at a center of said winding portion, said each rotor core including two bulged portions arranged outside of said winding portion, said bulged portions having an outer circular shape concentric with said shaft hole, said outer circular shape having a diameter larger than a width of said winding portion, said each rotor core including two crimping means extending from said bulged portions in a direction at right angles to a direction in which said winding portion extends.

6. A small generator as set forth in claim 5 wherein said bulged portions are provided outside said shaft hole of said rotor said crimping means have a width smaller than the diameter of said shaft hole and are provided at a center of said bulged portions.

7. A generator in accordance with claim 5, wherein:

said crimping means aligns said plurality of rotor cores together into the rotor.

8. A rotor in accordance with claim 5, wherein:

said crimping means are arranged outside of said magnetic path.

9. A generator in accordance with claim 5, wherein:

said crimping means aligns said plurality of rotor cores together into the rotor, and are arranged outside of said magnetic path.

* * * * *